US012606142B2

(12) United States Patent
Aritomi et al.

(10) Patent No.: US 12,606,142 B2
(45) Date of Patent: Apr. 21, 2026

(54) ELECTRIC-PARKING-BRAKE CONTROL DEVICE AND ELECTRIC-PARKING-BRAKE CONTROL METHOD

(71) Applicant: Hitachi Astemo, Ltd., Hitachinaka (JP)

(72) Inventors: Shunsuke Aritomi, Tokyo (JP); Shinji Seto, Tokyo (JP); Norikazu Matsuzaki, Hitachinaka (JP); Kimio Nishino, Hitachinaka (JP); Daisuke Kojima, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 696 days.

(21) Appl. No.: 17/928,793

(22) PCT Filed: May 13, 2021

(86) PCT No.: PCT/JP2021/018190
§ 371 (c)(1),
(2) Date: Nov. 30, 2022

(87) PCT Pub. No.: WO2021/246124
PCT Pub. Date: Dec. 9, 2021

(65) Prior Publication Data
US 2023/0227017 A1 Jul. 20, 2023

(30) Foreign Application Priority Data
Jun. 3, 2020 (JP) ................................. 2020-096707

(51) Int. Cl.
*B60T 13/74* (2006.01)
*B60T 13/66* (2006.01)
*H02P 29/40* (2016.01)
(52) U.S. Cl.
CPC ............ *B60T 13/74* (2013.01); *B60T 13/662* (2013.01); *H02P 29/40* (2016.02)

(58) Field of Classification Search
CPC ........ B60T 13/74; B60T 13/662; B60T 7/107; B60T 13/741; B60T 17/22; H02P 29/40;
(Continued)

(56) References Cited

U.S. PATENT DOCUMENTS 8,972,140 B2 * 3/2015 Kotake ................. B60T 13/741
701/70
2015/0066324 A1 3/2015 Baehrle-Miller et al.
(Continued)

FOREIGN PATENT DOCUMENTS

JP 2015-512824 A 4/2015
JP 2018-118524 A 8/2018
JP 2020-050073 A 4/2020

OTHER PUBLICATIONS

WO document No. WO 2018/135512 to Furukawa et al published on Jul. 26, 2018.*
(Continued)

*Primary Examiner* — Pamela Rodriguez
(74) *Attorney, Agent, or Firm* — Volpe Koenig

(57) ABSTRACT

Accurately controlling pressing thrust regardless of an individual difference and a use situation of a brake apparatus, and the like are set forth herein. The present invention controls a motor that applies thrust to a piston that presses a brake pad, in a current variation period before an idling current period, a variation in the current and the voltage or a variation in a function including the current and the voltage in the idling current period is computed as a plurality of prospective values. At a predetermined time T0 during the current variation period, one of the plurality of prospective values is selected on the basis of the current and the voltage, and on the basis of the variation in the current and the voltage or the function related to the selected prospective
(Continued)

value, a characteristic parameter of the motor is computed to compute a stop current of the motor.

12 Claims, 7 Drawing Sheets

(58) Field of Classification Search
 CPC ........ H02P 3/04; H02P 29/032; F16D 65/183;
 F16D 2121/24
 See application file for complete search history.

(56) References Cited

U.S. PATENT DOCUMENTS

| | | | |
|---|---|---|---|
| 2016/0025169 A1 | 1/2016 | Holder et al. | |
| 2016/0052496 A1* | 2/2016 | Seto | F16D 55/225 |
| | | | 188/72.1 |
| 2019/0257378 A1 | 8/2019 | Masuda et al. | |
| 2023/0043134 A1* | 2/2023 | Seto | F16D 65/18 |

OTHER PUBLICATIONS

WO document No. WO 2020090376 to Ajima et al published on May 7, 2020.*
Extended European Search Report issued on May 17, 2024 for European Patent Application No. 21816797.1.
Formentin, S., et al., "Data-driven clamping force control for an Electric Parking Brake without Speed Measurement", Article, IEEE Conference on Decision and Control, USA, Dec. 17, 2018.
International Search Report, PCT/JP2021/018190, dated Jul. 13, 2021. 2 pages.
Summons to attend oral proceedings pursuant to Rule 115(1)EPC dated July 16, 2025 for the European Patent Application No. 21816797.1

* cited by examiner

ELECTRIC-PARKING-BRAKE CONTROL DEVICE AND ELECTRIC-PARKING-BRAKE CONTROL METHOD

TECHNICAL FIELD

The present invention relates to an electric-parking-brake control device and an electric-parking-brake control method used for a vehicle such as an automobile.

BACKGROUND ART

Conventionally has been proposed as a brake apparatus is an electric brake that presses a pressing member, such as a brake shoe or a drum shoe, against a rotating member, such as a brake disc or a brake drum, by rotation of a motor to perform braking. In a case where sufficient pressing thrust is not obtained for a required braking force, the electric brake cannot hold the vehicle due to an insufficient braking force. In addition, in a case where excessive pressing thrust is generated, it is necessary to excessively secure the strength of each portion of the brake apparatus in preparation for the excessive pressing thrust.

Accordingly, it is necessary to accurately control the pressing thrust (hereinafter referred to as thrust) by a simple method regardless of an individual difference and a use situation of the brake apparatus, and the like. As a technique for controlling the pressing thrust, for example, there is a technique disclosed in PTL 1.

CITATION LIST

Patent Literature

PTL 1: JP 2015-512824 A

SUMMARY OF INVENTION

Technical Problem

In the technique described in PTL 1, described is a "method including: determining a clamping force as a function of a motor constant of a brake motor; and calculating the motor constant from the most recent measured value of a motor current (I0, IA) measured during the operation of the brake motor, in which an idling voltage (Us0) and an idling current (I0) in the brake motor are measured during an idling phase, and the motor current (IA) is calculated during a dynamic current variation phase to determine the motor constant (KM)", and disclosed is a method for controlling thrust by determining a current-cutting-off threshold using the motor constant computed here.

However, in a case where there is no idling phase due to, for example, a small gap between the brake pad and the disc, it is difficult to accurately perform the computation. In addition, it is necessary to measure the current and voltage values for a long time from the current variation phase to the idling phase, and thus there are problems that a storage capacity for storing the measured data increases, a computation load at the time of performing computation from the measured data increases, and the computation accuracy of the pressing thrust is poor.

An object of the present invention is to provide an electric-parking-brake control device and an electric-parking-brake control method capable of improving computation accuracy of pressing thrust regardless of an individual difference and a use situation of a brake apparatus, and the like.

Solution to Problem

In order to achieve the above object, the present invention is an electric-parking-brake control device including a controller that controls thrust of a piston that presses a brake pad by driving of a motor on the basis of a current and a voltage, in which the controller includes a motor stop current computation unit that computes a stop current of the motor, and the motor stop current computation unit: in a current variation period before an idling current period, computes, as a plurality of prospective values, a variation in the current and the voltage or a variation in a function including the current and the voltage in the idling current period; at a predetermined time during the current variation period, selects one of the plurality of prospective values on the basis of the current and the voltage; and on the basis of the variation in the current and the voltage or the function related to the selected prospective value, computes a characteristic parameter of the motor to compute a stop current of the motor.

Further, the present invention is an electric-parking-brake control method for controlling thrust of a piston that presses a brake pad by driving of a motor on the basis of a current and a voltage, the method including: in a current variation period before an idling current period, computing, as a plurality of prospective values, a variation in the current and the voltage or a variation in a function including the current and the voltage in the idling current period; at a predetermined time during the current variation period, selecting one of the plurality of prospective values on the basis of the current and the voltage; and on the basis of the variation in the current and the voltage or the function related to the selected prospective value, computing a characteristic parameter of the motor to compute a stop current of the motor.

Advantageous Effects of Invention

The present invention can provide an electric-parking-brake control device and an electric-parking-brake control method capable of improving computation accuracy of pressing thrust regardless of an individual difference and a use situation of a brake apparatus, and the like.

DESCRIPTION OF EMBODIMENTS

Hereinafter, embodiments of electric parking brake apparatuses according to the present invention will be described with reference to the drawings.

Note that the present invention is not limited to the following embodiments, and various modifications and application examples are included in the scope of the present invention in the technical concept of the present invention. In particular, a disc type brake is exemplified below, but the present invention can also be applied to a brake apparatus of another type, such as a drum type.

First Embodiment

Figure 1:
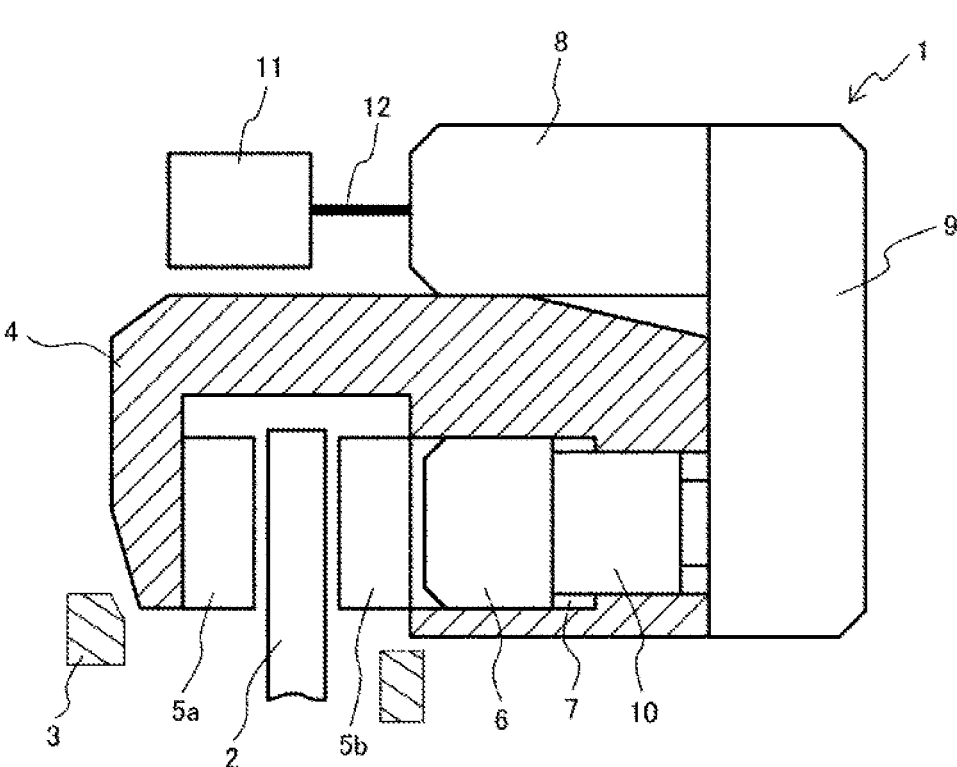
FIG. 1 is a cross-sectional view illustrating a configuration of an electric parking brake apparatus according to an embodiment of the present invention.

First, a first embodiment of a brake apparatus according to the present invention will be described with reference to FIGS. 1 through 8. FIG. 1 is a cross-sectional view illustrating a configuration of an electric parking brake apparatus according to an embodiment of the invention, and FIG. 2 is a diagram illustrating a configuration example of a vehicle including the electric parking brake apparatus in FIG. 1.

Figure 2:
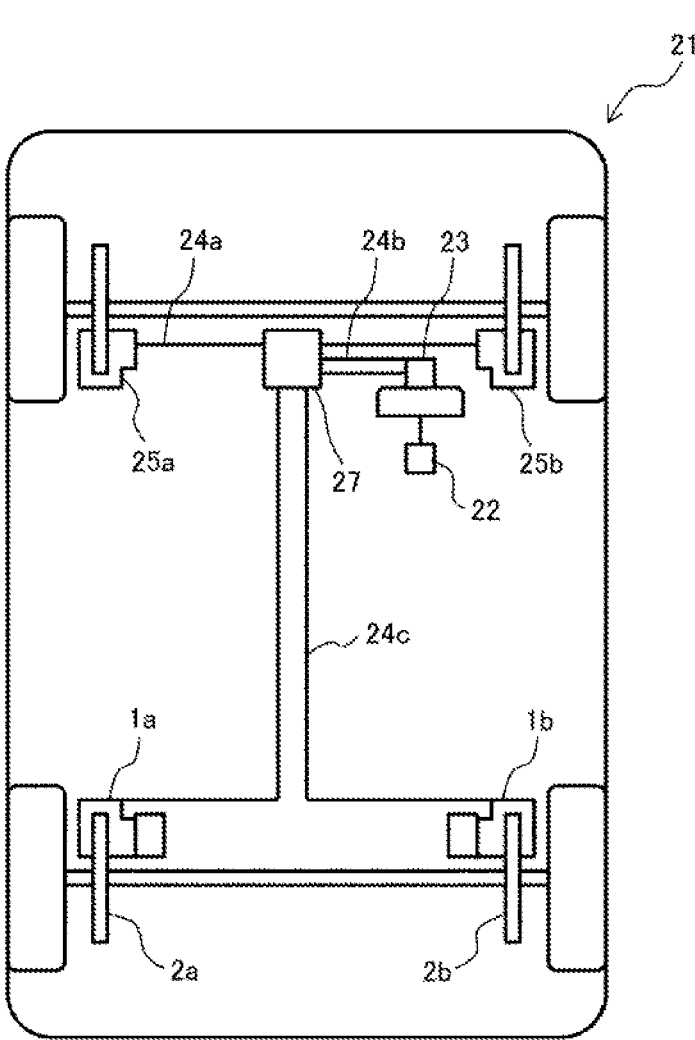
FIG. 2 is a diagram illustrating a configuration example of a vehicle including the electric parking brake apparatus in FIG. 1.

As illustrated in FIG. 2, brake apparatuses to which present embodiment is applied are disc brake apparatuses 1a and 1b (the configurations of 1a and 1b are the same), and are provided at left and right rear wheel portions of a vehicle 21. The disc brake apparatuses 1a and 1b obtain a braking force by pressing brake pads against discs 2a and 2b rotating together with the rear wheels.

The vehicle 21 includes a brake pedal 22 operated by the driver, a master cylinder 23 that includes an internal piston moved by the operation of the brake pedal 22 to generate a pressure, pipes 24a, 24b, and 24c that transmit the pressure to left and right front wheels and rear wheels, and disc brake apparatuses 25a and 25b (the configurations of a and b are the same) of the front wheels. Note that a hydraulic-pressure control apparatus 27 is disposed between the master cylinder 23 and the pipe 24 of each wheel to control the hydraulic pressure and perform a side-slip prevention, and the like.

As illustrated in FIG. 1, the disc brake apparatus 1 (since a and b have the same configuration, a and b are omitted below) arranged at the rear wheel includes a carrier 3 fixed to a non-rotating portion of the vehicle 21 located closer to the inside of the vehicle 21 than a disc rotor (rotating member) 2 is, a cylinder 4 supported floatably in an axial direction of the disc rotor 2, brake pads (pressing members) 5a and 5b disposed on both sides of the disc rotor 2, a piston 6 slidable in the cylinder 4, a pressure chamber 7, and a motor 8 for driving the piston 6. An output shaft of the motor 8 is connected to a reduction drive 9, an output shaft of the reduction drive 9 is connected to a rotation-to-linear-motion conversion mechanism 10, and the rotation-to-linear-motion conversion mechanism 10 can move the piston 6 in a linear-motion direction. The motor 8 is connected to a controller 11 by an electric wire 12. The pressure chamber 7 is connected to the pipe 24. The controller 11 (control unit) controls the rotation of the motor 8.

Figure 3:
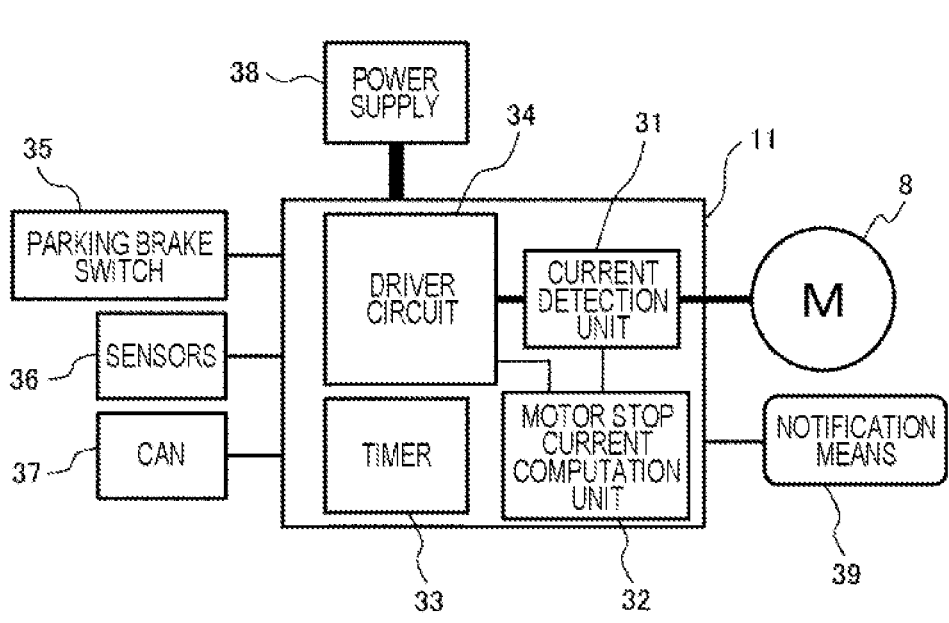
FIG. 3 is a block diagram illustrating a configuration of a controller 11.

FIG. 3 is a block diagram illustrating a configuration of the controller 11. As illustrated in FIG. 3, the controller 11 includes a current detection unit 31 that detects the current during driving of the motor 8, a motor stop current computation unit 32 that computes a stop current of the motor 8 from the current during driving of the motor 8 detected by the current detection unit 31, a timer 33 that measures the detection time of the current detection unit 31, and a driver circuit 34 that controls the motor 8 on the basis of a current value detected by the current detection unit 31 and a result computed by the motor stop current computation unit 32. The motor stop current computation unit 32 executes the computation on the basis of a control program stored in a storage unit (not illustrated).

Also connected to the controller 11 are a parking brake switch 35 operated by the driver, various sensors 36 for acceleration, vehicle speed, and the like, a controller area network (CAN) 37 for acquiring information on each unit of the vehicle 21, and a power supply 38, so that the power supply to the motor 8 is controlled according to the respective signals. Furthermore, a notification means 39, such as a warning light, is connected to the controller 11 as necessary. The various sensors 36 include a power supply sensor that detects the power supply, and a voltage sensor that detects the voltage of the motor.

Next, operations of the brake apparatus 1 will be described. First, the operation in a case where the brake apparatus 1 is used as a service brake will be described. When the driver operates the brake pedal 22, the master cylinder 23 generates a hydraulic pressure, and the hydraulic pressure communicates with the pressure chamber 7 through the pipe 24. Therefore, a force due to the pressure propels the piston 6 to generate a force that presses the brake pads 5a and 5b against the disc rotor 2 to generate a braking force. The brake apparatus to which the hydraulic-pressure control apparatus 27 and the like are added can generate a necessary hydraulic pressure with the hydraulic-pressure control apparatus 27 regardless of the operation of the brake pedal 22 by the driver, and similarly generates a braking force by the generated hydraulic pressure.

Next, an operation of a parking brake will be described. A braking force is generated on the basis of the detection of a switching-on operation of the parking brake switch 35 by the driver, a vehicle state, or the like, and an applying command 41 from the controller 11 for thrust generation. On the basis of the command, the motor 8 is driven, and the driving force of the motor 8 generates thrust of the piston 6 via the reduction drive 9, the rotation-to-linear-motion conversion mechanism 10, and the like. This operation is illustrated in FIG. 4.

Figure 4:
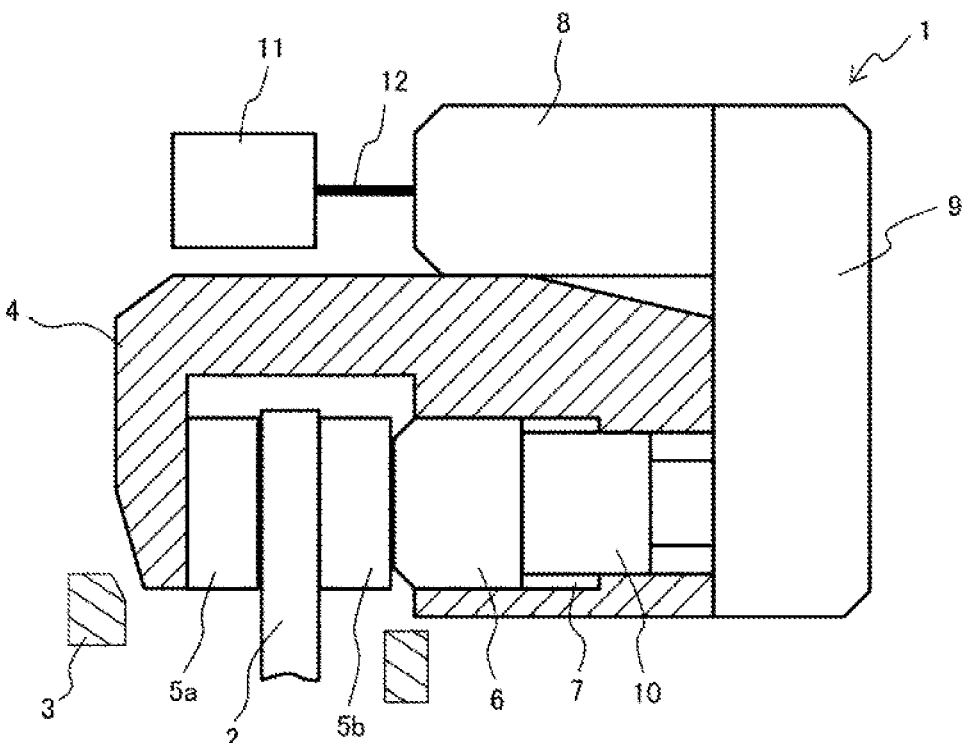
FIG. 4 is a cross-sectional view illustrating the electric parking brake apparatus at a time of clamping.

FIG. 4 is a cross-sectional view illustrating the electric parking brake apparatus at the time of clamping. As illustrated in FIG. 4, the piston 6 comes into contact with the brake pad 5b, and a force is generated in the cylinder 4 in a direction in which the brake pad 5a is pressed against the disc rotor 2, so that the disc rotor 2 is sandwiched between the brake pads 5a and 5b to generate a braking force. When a necessary braking force is obtained, the driving of the motor 8 is stopped.

Figure 5:
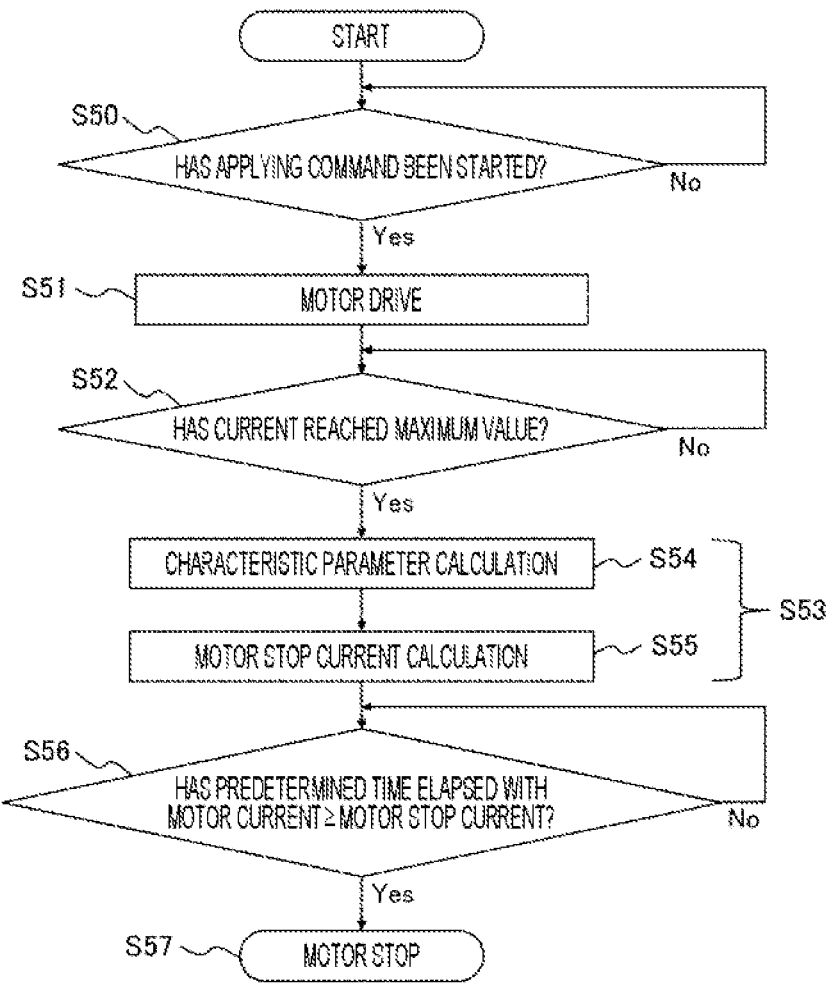
FIG. 5 is a flowchart illustrating operations of the controller 11.

A flowchart at this time is illustrated in FIG. 5. FIG. 5 is a flowchart illustrating operations of the controller 11.

First, when the motor stop current computation unit 32 of the controller 11 determines that an applying command has been started (Yes in step S50), the motor 8 is driven (step S51). In a case where an applying command is not started (No in step S50), the determination of the start of an applying command is repeated.

Next, after the motor 8 is driven, the controller 11 determines whether or not the current has reached the maximum value, and in a case where the current has reached the maximum value (Yes in step S52), a motor stop current computation (step S53) is performed. In the motor stop current computation (step S53), a characteristic parameter calculation (step S54), and a motor stop current calculation (step S55) based on the characteristic parameters are performed. The processing of the motor stop current computation (step S53) will be described in detail later.

After the motor stop current calculation, in a case where a motor current 43 (current) exceeds a computed motor stop current 44 or if it is determined that a predetermined time has elapsed after the exceeding (Yes in step S56), the motor 8 stops (step S57).

Figure 6:
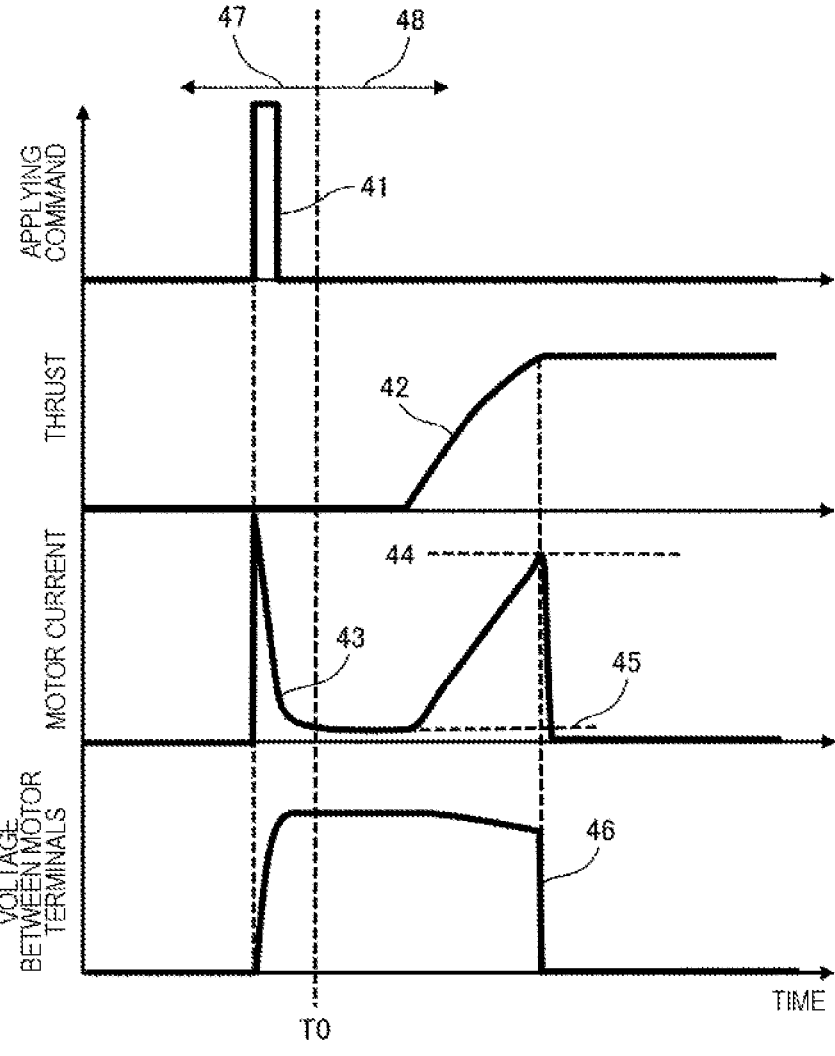
FIG. 6 is a diagram illustrating time history waveforms of an applying command, thrust, a motor current, and a voltage between terminals.

In addition, FIG. 6 illustrates time history waveforms of the applying command 41, a thrust 42, the motor current 43, and a voltage between the motor terminals during this time. When the applying command 41 is input, the motor 8 is driven and the piston 6 is moved in a direction approaching the brake pad 5b. Then, the piston 6 idles until coming into contact with the brake pad 5b. At this time, the load applied to the motor 8 is small, and the motor current 43 maintains a substantially constant low value (idling current 45). After an inrush current flows immediately after the start of driving of the motor, the motor current 43 converges, and the current flowing from the convergence until the piston 6 comes into contact with the brake pad 5b is the idling current 45. Here, a period before a predetermined time T0 is defined as a current variation period 47, and a period after the current variation period 47 is defined as an idling current period 48. The predetermined time T0 is a boundary point at which the motor current 43 becomes substantially constant from a state in which the motor current 43 varies.

Then, when the piston 6 and the brake pad 5b come into contact with each other, the thrust 42 of the piston 6 increases. As the thrust 42 increases, the pressing force by which the brake pad 5b presses the disc rotor 2 also starts to increase, the load on the motor 8 gradually increases, and accordingly, the motor current 43 increases.

In a case where the motor current 43 exceeds the motor stop current 44, the motor 8 is stopped. Alternatively, since the current detected by the sensor is collected at every sampling time, the motor may be stopped when the detected currents exceed the motor stop current 44 a predetermined number of times (for example, three times).

Figure 7:
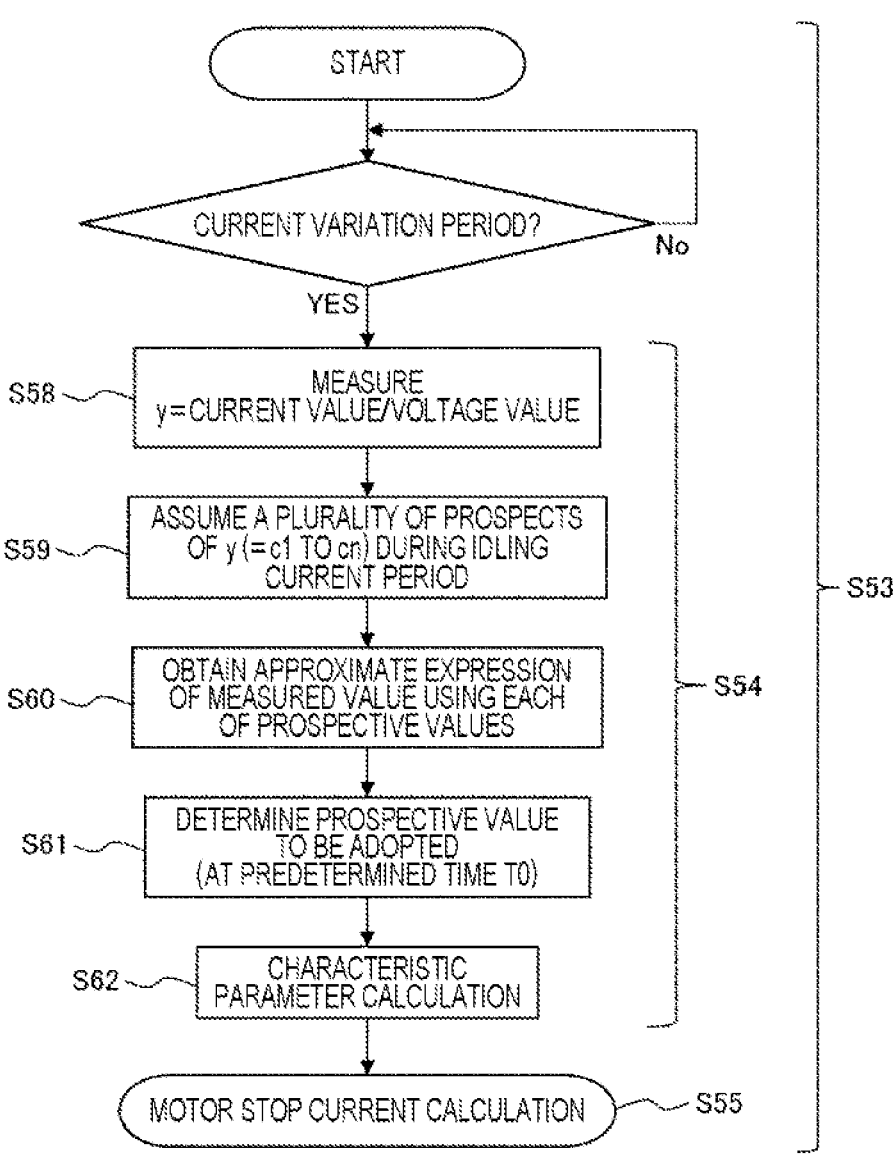
FIG. 7 is a flowchart illustrating a procedure of a motor stop current computation.

How to determine the motor stop current 44 (motor stop current computation S53) will be described in detail with reference to FIG. 7. FIG. 7 is a flowchart illustrating a procedure of the motor stop current computation.

Step S53 of the motor stop current computation includes step S54 that is a portion for computing, in a case where a motor current 43 is in the current variation period 47, characteristic parameters on the basis of the current and the voltage in the current variation period 47, and a motor stop current calculation step S55 for computing a motor stop current 44 from the obtained characteristic parameters. The characteristic parameters are parameters that vary characteristics of individual motors.

In step S54 of the characteristic parameter computation, the current and the voltage, or a function including the current and the voltage is measured (step S58). Then, the current and the voltage, or the function including the current and the voltage during the idling current period 48 is assumed as a plurality of prospective values (c1 to cn) (step S59), and an approximate expression (step S60) for reproducing a measured value is obtained using each prospective value. The plurality of assumed prospective values (c1 to cn) is stored in a memory of the motor stop current computation unit. 32, or the like in the controller 11. Then, from the plurality of prospective values (c1 to cn), the prospective value that can most accurately reproduce a measured value is selected and determined at the predetermined time T0

(step S61), and the selected prospective value is used to compute the characteristic parameters (step S62).

A specific procedure of step S56 in the characteristic parameter computation will be described in detail below. First, the main behavior of the electric parking brake apparatus is expressed by the following Expression (1).

[Formula 1]

$$K_t I(t) = KF_{CLP} + J\frac{d\omega(t)}{dt} + T_{fric} + \lambda\omega(t) \tag{1}$$

In Expression (1), Kt represents a torque constant, I represents a current, K represents a rotation-to-linear-motion conversion coefficient of the rotation-to-linear-motion conversion mechanism 10, FCLP represents a pressing thrust, J represents an inertia coefficient ($Jd\omega/dt$ is an inertia term), Tfric represents a friction torque obtained by considering the motor 8 to the rotation-to-linear-motion conversion mechanism 10 of a power transmission mechanism in total, λ represents a viscosity coefficient, and ω represents a rotational speed.

When Expression (1) is transformed, the current at a time when the pressing force is FCLP can be calculated.

[Formula 2]

$$I(t) = \frac{t}{K_T}\left(KF_{CLP} + J\frac{d\omega(t)}{dt} + T_{fric} + \lambda\omega(t)\right) \tag{2}$$

Therefore, in a case where the pressing force to be held is FCLP, if the motor is stopped at a current value I obtained with Expression (2), the pressing force becomes FCLP, and thus this value is set as a motor stop current 44. However, in order to set this value, values of the parameters and variables in Expression (2) (hereinafter, referred to as characteristic parameters, such as the torque constant Kt, the friction torque Tfric, the viscosity coefficient λ, and the rotational speed ω) are required. Since these values vary depending on the unevenness of individual motors and the environment, such as the temperature and the voltage, it is necessary to set the motor stop current 44 considering these variations to accurately control the thrust. Therefore, in the present embodiment, the characteristic parameters are estimated from a variation in the current and the voltage, or a variation in the function including the current and the voltage. As a result, considering the environment and the unevenness of individual motors, it is possible to suppress excessive stress applied to the mechanical system of the electric parking brake apparatus due to the generation of the thrust more than necessary in an individual motor having good mechanical efficiency and motor characteristics while always ensuring required thrust (for example, thrust required for an automobile to stop on a slope) even under a condition where the thrust is difficult to be generated, such as low mechanical efficiency or low motor performance.

A method for estimating the characteristic parameters in the present embodiment will be described below. A current waveform immediately after the motor is started is determined by an equation of an electric circuit and an equation of motion. The equation of an electric circuit is expressed by the following Expression (3).

[Formula 3]

$$V = RI(t) + L\frac{dI(t)}{dt} + \omega(t)K_t \quad (3)$$

Here, R represents an electric resistance, and L represents an inductance. In Expression (1), FCLP=0 before the thrust is generated, and this term can be ignored, and thus the equation of motion is expressed as in Expression (4).

[Formula 4]

$$K_t I(t) = J\frac{d\omega(t)}{dt} + T_{fric} + \lambda\omega(t) \quad (4)$$

Although it is difficult to strictly solve these two calculation expressions, LdI/dt in Expression (3) is a term that rapidly decreases within several ms and thus is ignored, and if Tfric in Expression (4) is also small compared with the other terms, the two calculation expressions can be approximately solved as in Expression (5). In the present embodiment, a case where Tfric is small compared with the other terms is shown, but in a case where λω is smaller, Tfric may not be ignored and λω may be ignored to approximately solve the two calculation expressions.

[Formula 5]

$$\frac{I(t)}{V} = \frac{K_t^2}{RK_t^2 + R^2\lambda}\exp\left(-\frac{K_t^2 + R\lambda}{JR}t\right) + \frac{\lambda}{K_t^2 + R\lambda} \quad (5)$$

In general, the torque constant Kt is larger as the temperature is lower, the electric resistance R is smaller as the temperature is lower, and the viscosity coefficient is larger as the temperature is lower. Similarly, the individual unevenness of the motor, the characteristic unevenness of grease to be used, and the like affect the characteristic parameters. Expression (5) means that characteristic parameter variations due to these temperature and unevenness appear in the variations in the current and the voltage.

Figure 8:
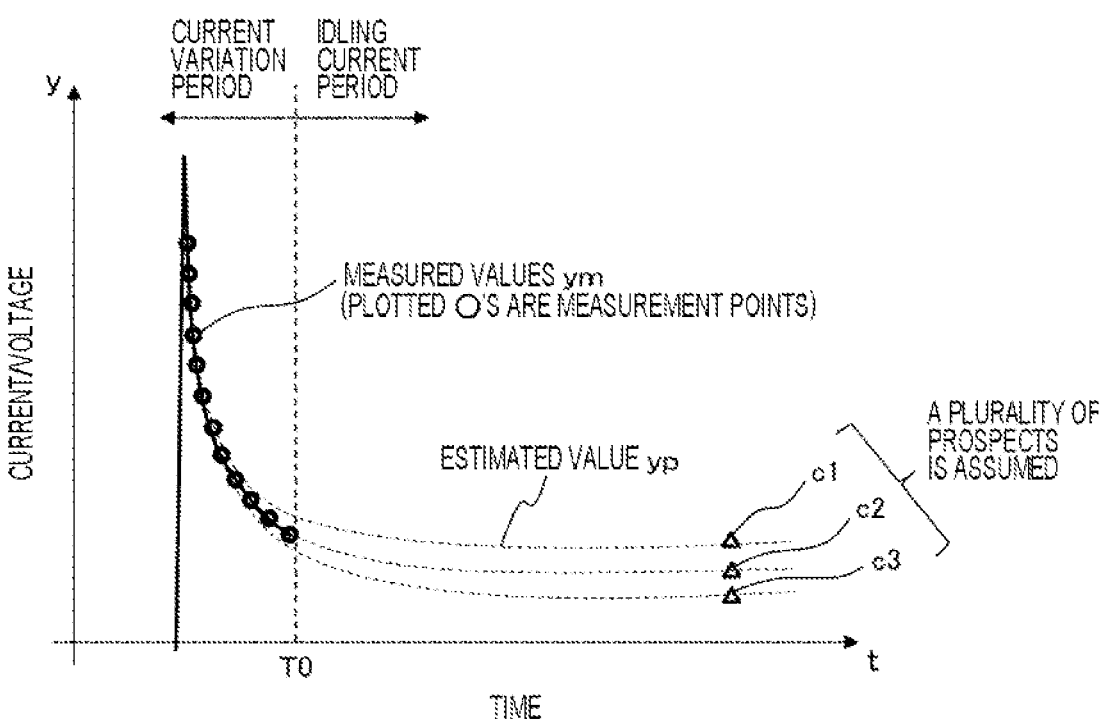
FIG. 8 is a schematic diagram illustrating waveform measurement and computation outline.

Therefore, in the present embodiment, the characteristic parameters are estimated using this relational expression. For example, there is a method for measuring the waveform of the current divided by the voltage immediately after the starting, and determining the characteristic parameters on the right side of Expression (5) in conformity with the waveform. FIG. 8 is a schematic diagram illustrating the waveform measurement and computation outline, and the graph of FIG. 8 illustrates a temporal variation in the current divided by the voltage, which is the left side of Expression (5). The temporal variation in the current divided by the voltage is measured in the current variation period 47, and at the predetermined time T0, the following computation is performed from the measured values to estimate the characteristic parameters. Here, the coefficients including the characteristic parameters are replaced as follows:

[Formula 6]

$$y = \frac{I(t)}{V}, \quad (6)$$

$$a = \frac{K_t^2}{RK_t^2 + R^2\lambda},$$

$$b = -\frac{K_t^2 + R\lambda}{JR},$$

$$c = \frac{\lambda}{K_t^2 + R\lambda}$$

Then, Expression (5) becomes Expression (7).

[Formula 7]

$$y = a\,\exp(-bt) + c \quad (7)$$

The three unknowns of a, b, and c can be obtained by optimization or the like to make y's closer to measured values ym's, but a method for obtaining the unknowns by least squares will be described here to enable the computation in a short time by a simpler technique. The logarithms of both sides of Expression (7) are taken, and the logarithms are put as in Expression (8).

[Formula 8]

$$Y = \ln(y - c), A = \ln a \quad (8)$$

The computation can be treated as a problem in which a first-order approximate straight line is obtained, as in Expression (9).

[Formula 9]

$$Y = -bt + A \quad (9)$$

Here, c is required to obtain b and A in Expression (9). On the other hand, as time t in Expression (7) passes, y gradually approaches c, but the value of c is unknown at the time point T0 at which the current variation period 47 ends. From this, in the present embodiment, as illustrated in FIG. 8, c is assumed as a plurality of prospective values, b and A (=lna) are obtained for each of the prospective values, and respective estimated curves yp are obtained using b's, A's (=lna's) and assumed c's. Then, among the obtained estimated curves yp, a, b, and c of the obtained estimated curve yp that most accurately reproduces measured values ym are adopted. Then, the characteristic parameters are computed on the basis of Expression (10) obtained by solving simultaneous equations of Expression (6) using adopted a, b, and c. As a criterion for determining values to be adopted, for example, a, b, and c may be selected so that the squared error between estimated values yp and measured values ym is the smallest.

[Formula 10]

$$R = \frac{1}{a + c}, \quad (10)$$

$$\lambda = \frac{bcJ}{a + c},$$

$$K_t = \sqrt{\frac{abJ}{a^2 + 2ac + c^2}}$$

Finally, the obtained characteristic parameters are substituted into Expression (2) to obtain a motor stop current 44. A method in which at this time, supposed worst values (values at which the thrust is minimized) are used for K, Tfric, and the like that are not obtained as the characteristic parameters, and w is obtained as a function of the voltage V is exemplified.

Note that an assumption method at a time of assuming unknown c as a plurality of prospective values may be as follows: As shown in Expression (6), c is a function of the torque constant Kt, the electric resistance R, and the viscosity coefficient $\lambda$. Therefore, in a case where these are known in advance as a design value, a specification, or the like, c obtained from these values may be set as a prospective value c1. The other prospective values may be set as ratios to c1, such as $c2=c1\times0.9$, $c3=c1\times0.8$ ... , using a ratio or the like. Alternatively, the final value among measured values measured in the current variation period 47 may be set as c1. Furthermore, in a case where the operation is performed a plurality of times, a prospective value c selected at the time of the previous operation may be set as c1 for the current operation. In these cases, since a plurality of prospective values is computed in advance before the start of driving of the motor 8 and stored in, for example, the memory of the motor stop current computation unit 32, the computation of the motor stop current can be made faster.

According to the first embodiment, obtaining the motor stop current 44 with the above configuration allows the characteristic parameters to be computed in a short time regardless of the presence or absence of the idling current period, and as a result, it is possible to provide an electric-parking-brake control device and an electric-parking-brake control method capable of accurately controlling the thrust by a simple method.

Second Embodiment

Next, a second embodiment of the present invention will be described. To implement the first embodiment, there is a method in which measured values measured in a current variation period 47 are stored until a predetermined time T0, and the computation is performed at T0 to obtain a motor stop current 44. However, in the second embodiment, shown is a method in which the computation is sequentially performed at predetermined time intervals (measurement timings) to perform the computation without storing the measured values until T0.

Specifically, as illustrated in FIG. 8, data on the current divided by the voltage is measured at predetermined time intervals (12 times in FIG. 8), and sequential computations in which at every measurement timing, computed values computed according to least squares are added up are performed to obtain A and b in Expression (9). In this case, since an unknown c needs to be assumed at the first computation, the unknown c may be obtained from a design value, a specification, or the like known in advance, as described in the first embodiment. In a case where the operation is performed a plurality of times, the previous adopted value c may be used.

A and b obtained by repeating the above computation the times of the measurements until a predetermined time T0 are used to compute characteristic parameters in the same manner as in the first embodiment to obtain a motor stop current 44. According to this method, if only a value obtained by the adding-up is stored, it is not necessary to store the measured values before this value, and thus, it is possible to increase the number of measurements without increasing the storage capacity. As a result, it is possible to provide an electric-parking-brake control device and an electric-parking-brake control method capable of accurately controlling the thrust by a simple method.

In the above description, cases of the disc brakes have been exemplified as the embodiments, but a brake apparatus according to the present invention can also be applied to a drum brake. A brake apparatus according to the present invention is not limited to a vehicle, such as an automobile, and can be used for anything in which a braking force needs to be generated.

Although the embodiments of the present invention have been described in detail above, the present invention is not limited to the above-described embodiments, and various design changes can be made without departing from the spirit of the present invention described in the claims. For example, the above-described embodiments have been described in detail for the clear description of the present invention, and are not necessarily limited to those having the whole described configuration. In addition, part of the configuration of a certain embodiment can be replaced with the configuration of another embodiment, and the configuration of another embodiment can be added to the configuration of a certain embodiment. Furthermore, it is possible to add, omit, and replace another configuration to, from, and with part of the configuration of each embodiment.

REFERENCE SIGNS LIST 1 brake apparatus
1a, 1b disc brake apparatus
2 disc rotor (rotating member)
3 carrier
4 cylinder
5a, 5b brake pad (pressing member)
6 piston
7 pressure chamber
8 motor
9 reduction drive
10 rotation-to-linear-motion conversion mechanism
11 controller
12 electric wire
21 vehicle
22 brake pedal
23 master cylinder
24, 24a, 24b, 24c pipe
25a, 25b disc brake apparatus of front wheel
27 hydraulic-pressure control apparatus
31 current detection unit
32 motor stop current computation unit
33 timer
34 driver circuit
35 parking brake switch
36 sensors
38 power supply
39 notification means
41 applying command
42 thrust
43 motor current
44 motor stop current
45 idling current
47 current variation period
48 idling current period

The invention claimed is:

1. An electric-parking-brake control device, for improving accuracy in computing a motor stop current irrespective of variations in motor characteristics or absence of an idling period, comprising:

a controller that controls thrust of a piston that presses a brake pad by driving of a motor on a basis of a current of the motor and a voltage of the motor, wherein the controller includes a motor stop current computation unit that computes, prior to a generation of thrust sufficient to contact the brake pad, a stop current of the motor, and the motor stop current computation unit is configured to:

in a current variation period before an idling current period, compute, as a plurality of prospective values, a plurality of candidate parameter values each representing a variation in the current and the voltage or a variation in a function including the current and the voltage in the idling current period;

at a predetermined time during the current variation period that corresponds to a boundary point at which the current becomes substantially constant from a state in which the current varies, select one of the plurality of prospective values whose associated approximate expression most accurately reproduces a measured waveform of the current and the voltage; and on a basis of the variation in the current and the voltage or the function related to the selected prospective value, estimate at least one characteristic parameter of the motor including a torque constant, an electric resistance, or a viscosity coefficient, and compute the stop current of the motor from the at least one characteristics parameter.

2. The electric-parking-brake control device according to claim 1, wherein the plurality of prospective values are each computed on a basis of the current and the voltage at the predetermined time during the current variation period, and each of the plurality of prospective values correspond to a different assumed relationship between the current and the voltage for reproducing a measured waveform.

3. The electric-parking-brake control device according to claim 1, wherein the predetermined time corresponds to the boundary point at which the current becomes substantially constant from the state in which the current varies, such that the selected prospective value represents a transition from dynamic current change to a steady-state.

4. The electric-parking-brake control device according to claim 1, wherein the plurality of prospective values are computed and stored in a memory in advance before the driving of the motor starts, and the plurality of prospective values are ratios or scaled versions of a design-value parameter or a value obtained from a prior operation of a same motor.

5. The electric-parking-brake control device according to claim 4, wherein the plurality of prospective values are updated using a prospective value selected in a previous braking operation as an initial candidate for a subsequent breaking operation, thereby enabling adaptive learning of the at least one characteristic parameter of the motor.

6. The electric-parking-brake control device according to claim 1, wherein the motor stop current computation unit performs sequential computations at a plurality of measurement timings during the current variation period, as intermediate values, adds the intermediate values at each of the plurality of measurement timings to obtain cumulative coefficients, and estimate the at least one characteristic parameter and the motor stop current based on the cumulative coefficients, thereby reducing a required storage capacity while increasing an estimation accuracy.

7. An electric-parking-brake control method for controlling thrust of a piston that presses a brake pad by driving of a motor on a basis of a current of the motor and a voltage of the motor, and for improving accuracy in computing a motor stop current irrespective of variations in motor characteristics or absence of an idling period, the method comprising:

in a current variation period before an idling current period and prior to a generation of thrust sufficient to contact the brake pad, computing, as a plurality of prospective values, a plurality of candidate parameter values each representing a variation in the current and the voltage or a variation in a function including the current and the voltage in the idling current period;

at a predetermined time during the current variation period that corresponds to a boundary point at which the current becomes substantially constant from a state in which the current varies, selecting one of the plurality of prospective values whose associated approximate expression most accurately reproduces a measured waveform of the current and the voltage; and on a basis of the variation in the current and the voltage or the function related to the selected prospective value, estimating at least one characteristic parameter of the motor including a torque constant, an electric resistance, or a viscosity coefficient, and computing the stop current of the motor from the at least one characteristics parameter.

8. The electric-parking-brake control method according to claim 7, wherein the plurality of prospective values are each computed on a basis of the current and the voltage at the predetermined time during the current variation period, and each of the plurality of prospective values correspond to a different assumed relationship between the current and the voltage for reproducing a measured waveform.

9. The electric-parking-brake control method according to claim 7, wherein the predetermined time corresponds to the boundary point at which the current becomes substantially constant from the state in which the current varies, such that the selected prospective value represents a transition from dynamic current change to a steady-state.

10. The electric-parking-brake control method according to claim 7, wherein the plurality of prospective values are computed and stored in a memory in advance before the driving of the motor starts, and the plurality of prospective values are ratios or scaled versions of a design-value parameter or a value obtained from a prior operation of a same motor.

11. The electric-parking-brake control method according to claim 10, wherein the plurality of prospective values are updated using a prospective value selected in a previous braking operation as an initial candidate for a subsequent breaking operation, thereby enabling adaptive learning of the at least one characteristic parameter of the motor.

12. The electric-parking-brake control method according to claim 7, wherein the motor stop current computation unit performs sequential computations at a plurality of measurement timings during the current variation period, as intermediate values, adds the intermediate values at each of the plurality of measurement timings to obtain cumulative coefficients, and estimate the at least one characteristic parameter and the motor stop current based on the cumulative coefficients, thereby reducing a required storage capacity while increasing an estimation accuracy.

\* \* \* \* \*